United States Patent
Lee et al.

(10) Patent No.: US 12,415,571 B2
(45) Date of Patent: Sep. 16, 2025

(54) COUPLING STRUCTURE OF REAR END MODULE AND QUARTER REAR MEMBER

(71) Applicants: Hyundai Motor Company, Seoul (KR); Kia Corporation, Seoul (KR)

(72) Inventors: Hae-Hoon Lee, Gyeonggi-do (KR); Tae-Gyu Park, Gyeonggi-do (KR); Young-Rock Kim, Gyeonggi-do (KR); Jung-Ho Lee, Gyeonggi-do (KR); Hee-Suk Chung, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 465 days.

(21) Appl. No.: 17/978,555

(22) Filed: Nov. 1, 2022

(65) Prior Publication Data

US 2023/0278644 A1    Sep. 7, 2023

(30) Foreign Application Priority Data

Mar. 7, 2022    (KR) .................. 10-2022-0028636

(51) Int. Cl.
| | |
|---|---|
| *B62D 25/08* | (2006.01) |
| *B62D 25/02* | (2006.01) |
| *B62D 25/20* | (2006.01) |
| *B62D 27/02* | (2006.01) |

(52) U.S. Cl.
CPC .......... *B62D 25/08* (2013.01); *B62D 25/02* (2013.01); *B62D 25/20* (2013.01); *B62D 27/02* (2013.01); *B62D 27/023* (2013.01)

(58) Field of Classification Search
CPC ...... B62D 25/08; B62D 25/087; B62D 25/02; B62D 25/20; B62D 25/2036; B62D 27/023

USPC .......... 296/203.01, 4, 193.08, 29, 30, 187.11
See application file for complete search history.

(56) References Cited

U.S. PATENT DOCUMENTS

| | | | | |
|---|---|---|---|---|
| 4,887,859 A | * | 12/1989 | Aper | B62D 47/006 |
| | | | | 296/193.03 |
| 4,968,087 A | * | 11/1990 | Goria | B62D 65/04 |
| | | | | 296/29 |
| 6,505,884 B2 | * | 1/2003 | Phillips | B60R 19/56 |
| | | | | 180/69.21 |
| 11,332,196 B2 | * | 5/2022 | Kiyoshita | B62D 25/02 |
| 11,772,707 B2 | * | 10/2023 | Tsutsumi | B60Q 1/34 |
| | | | | 296/193.08 |
| 11,845,504 B2 | * | 12/2023 | Xin | B62D 65/04 |
| 2007/0138837 A1 | * | 6/2007 | Tomioka | B62D 25/02 |
| | | | | 296/203.04 |

(Continued)

FOREIGN PATENT DOCUMENTS

| | | |
|---|---|---|
| FR | 2865756 A1 | 8/2005 |
| KR | 10-2004-0024970 A | 3/2004 |

*Primary Examiner* — Dennis H Pedder
(74) *Attorney, Agent, or Firm* — Fox Rothschild LLP

(57) ABSTRACT

Provided is a coupling structure of a rear end module and a quarter rear member. The coupling structure includes a quarter rear member located on a rear portion of a side surface of a vehicle; a rear floor panel in which rear side members arranged in a longitudinal direction of the vehicle are bonded to both side surfaces of a bottom surface; a connection member having an upper portion bonded to one side of the quarter rear member and a lower end bonded to the rear floor panel; and a rear end module formed by injection to have an annular shape and coupled to a rear end of the connection member.

14 Claims, 11 Drawing Sheets

(56) References Cited

U.S. PATENT DOCUMENTS

| | | | |
|---|---|---|---|
| 2011/0156447 A1* | 6/2011 | Matsuoka | B62D 25/088 296/203.04 |
| 2013/0001986 A1 | 1/2013 | Takenaka | |
| 2014/0159428 A1 | 6/2014 | Katou et al. | |
| 2020/0086922 A1 | 3/2020 | Yamada et al. | |
| 2022/0379971 A1 | 12/2022 | Trifonoff | |

* cited by examiner

COUPLING STRUCTURE OF REAR END MODULE AND QUARTER REAR MEMBER

CROSS-REFERENCE TO RELATED APPLICATION

This application is based on and claims under 35 U.S.C. § 119(a) the benefit of Korean Patent Application No. 10-2022-0028636, filed on Mar. 7, 2022, which is incorporated herein by reference in its entirety.

TECHNICAL FIELD

Embodiments of the present disclosure relate to a coupling structure of a rear end module and a quarter rear member, in which the rear end module is coupled to a quarter rear member located on a rear portion of a side surface of a vehicle body and a member adjacent thereto on a rear end of a vehicle.

BACKGROUND

Sport utility vehicle (SUV), recreational vehicle (RV), etc. have a tailgate installed on a rear end of the vehicle, so that the rear end of the vehicle is opened and closed by opening and closing the tailgate.

The rear end of the vehicle is finished with a rear end part 120, and when the tailgate is closed, a circumference of the tailgate is in contact with a circumference of the rear end part 120. A lower corner part 121 of the rear end part is configured so that the rear end part is connected to a rear floor panel 116, a wheelhouse 115, and a quarter rear member 117, and reinforcing members 131, 132 for reinforcing rigidity are applied to the connection portions thereof.

However, according to the related art, the reinforcing members 131, 132 are not connected to each other, and the wheelhouse 115 and the quarter rear member 117 are not connected, so that a load path cannot be formed. As shown in FIG. 3, after the load input from the rear floor panel 116 is transmitted to the reinforcing member 131 applied between the rear end part and the rear floor panel 116, and then the load is transmitted to the reinforcing member 132 applied between the rear end part and the quarter rear member 117, but the load is not sufficiently transmitted.

As described above, since the load path is not formed in the lower corner part 121 of the rear end part, the load is not sufficiently distributed and thus the load is partially concentrated, which is a factor causing a reduction in rigidity.

The contents described in Description of Related Art are to help the understanding of the background of the present disclosure, and may include what is not previously known to those skilled in the art to which the present disclosure pertains.

SUMMARY OF THE DISCLOSURE

Embodiments of the present disclosure relate to a coupling structure of a rear end module and a quarter rear member, which allows the rear end module coupled to a rear end of a vehicle to be formed in an integrated annular structure and allows the quarter rear member to be connected to a lower end of the rear end module while maintaining a closed cross section, thereby improving rigidity.

A coupling structure of a rear end module and a quarter rear member according to embodiments of the present disclosure includes a quarter rear member located on a rear portion of a side surface of a vehicle; a rear floor panel in which rear side members arranged in a longitudinal direction of the vehicle are bonded to both side surfaces of a bottom surface; a connection member having an upper portion bonded to one side of the quarter rear member and a lower end bonded to the rear floor panel; and a rear end module formed by injection to have an annular shape and coupled to a rear end of the connection member.

In some embodiments, the connection member has middle and lower portions, other than the upper portion, spaced apart from the quarter rear member, and the lower end bonded to the rear floor panel, so that a closed cross section is formed between the quarter rear member, the connection member, and the rear floor panel.

In some embodiments, the connection member is formed to be bent toward an inside of the vehicle on the rear end of the side surface of the vehicle along a circumference of the rear floor panel.

In some embodiments, a reinforcing member is provided on one side of a front surface of the rear end module in order to reinforce rigidity between the rear end module and the connection member.

In some embodiments, the rear end module is injected by an over-mold method and coupled to the reinforcing member, so that a closed cross section is formed on the rear end module.

In some embodiments, a fastening bolt is fastened to the rear end module by penetrating the upper portion of the connection member and the reinforcing member.

In some embodiments, a back panel is interposed between the connection member and the reinforcing member.

In some embodiments, a rear end of the rear side member is bonded to the reinforcing member and the rear end module by an adhesive.

In some embodiments, a side end of the rear floor panel is bent downward and bonded to a lower portion of the quarter rear member.

In some embodiments, in a portion of the quarter rear member where the rear floor panel is bonded, a wheel housing is bonded to a side opposite to the rear floor panel.

In some embodiments, ribs are radially formed inside the rear end module.

According to the coupling structure of the rear end module and the quarter rear member according to embodiments of present disclosure having the above configuration, it possible to connect the wheel housing and the quarter rear member through the connection member to form the closed cross section, thereby improving rigidity, and to connect the closed cross section to the rear end module to form the load path, thereby distributing the load.

In some embodiments, the connection member is bent may be coupled to the reinforcing member.

In some embodiments, the reinforcing member is made of a metallic material.

In some embodiments, the rear end module is injected with a synthetic resin.

In some embodiments, the rear side member is bonded to a bottom surface of the rear floor panel.

As described above, the structure in which the load is distributed is configured, thereby increasing connectivity on the corner part of the rear end module and improving skeletal rigidity.

DESCRIPTION OF SPECIFIC EMBODIMENTS

Figure 1:
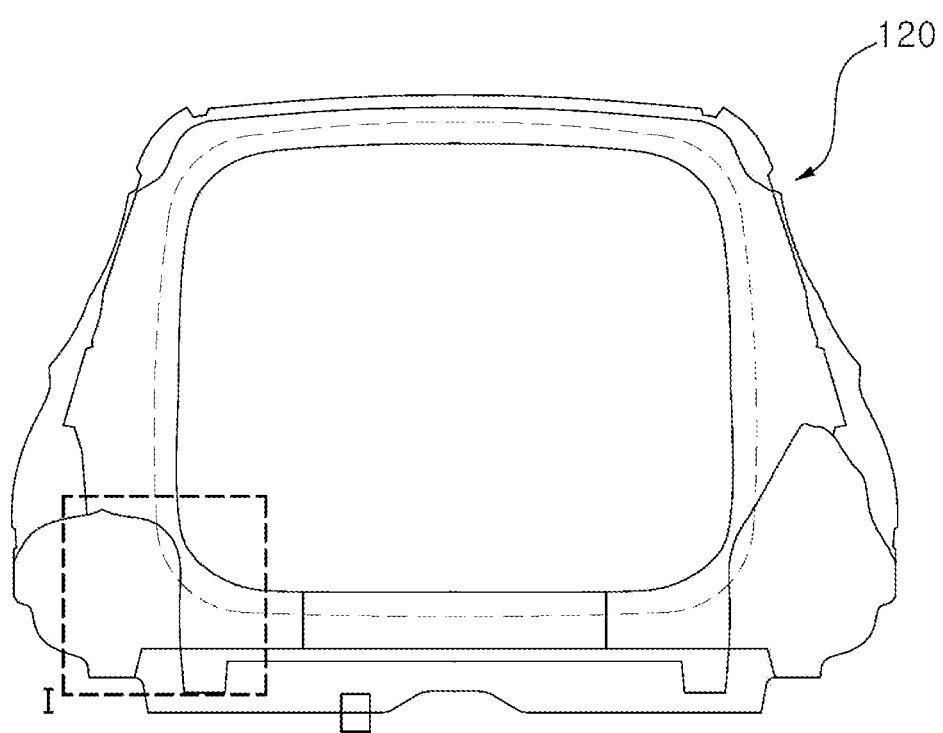
FIG. 1 is a front diagram of a rear end part according to the related art.
Figure 2:
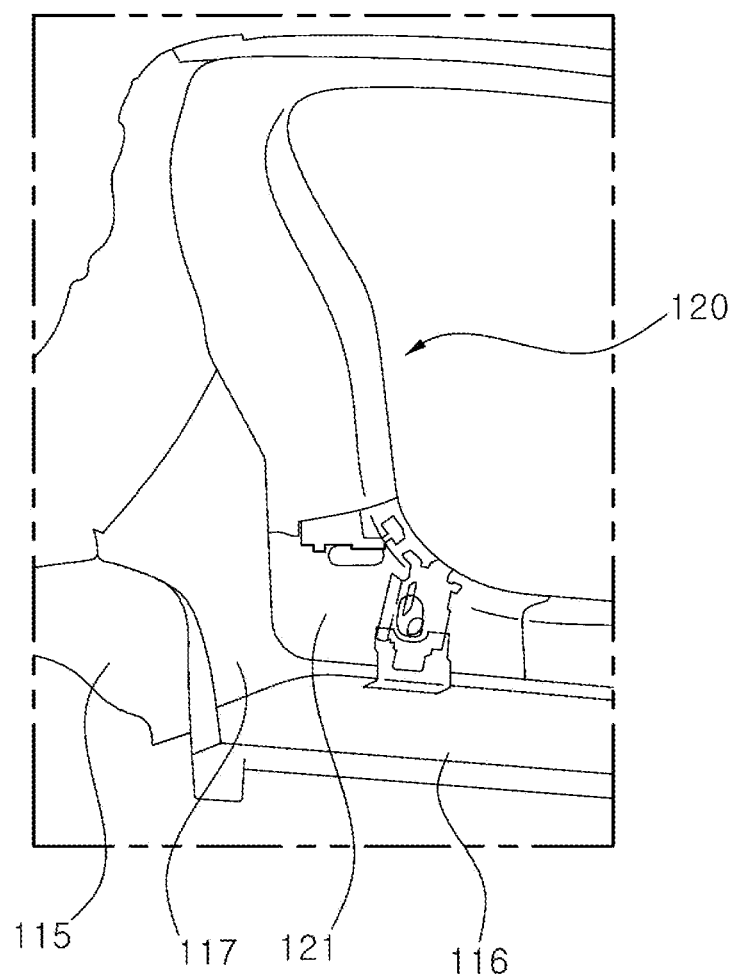
FIG. 2 is a detailed diagram of portion I of FIG. 1.
Figure 3:
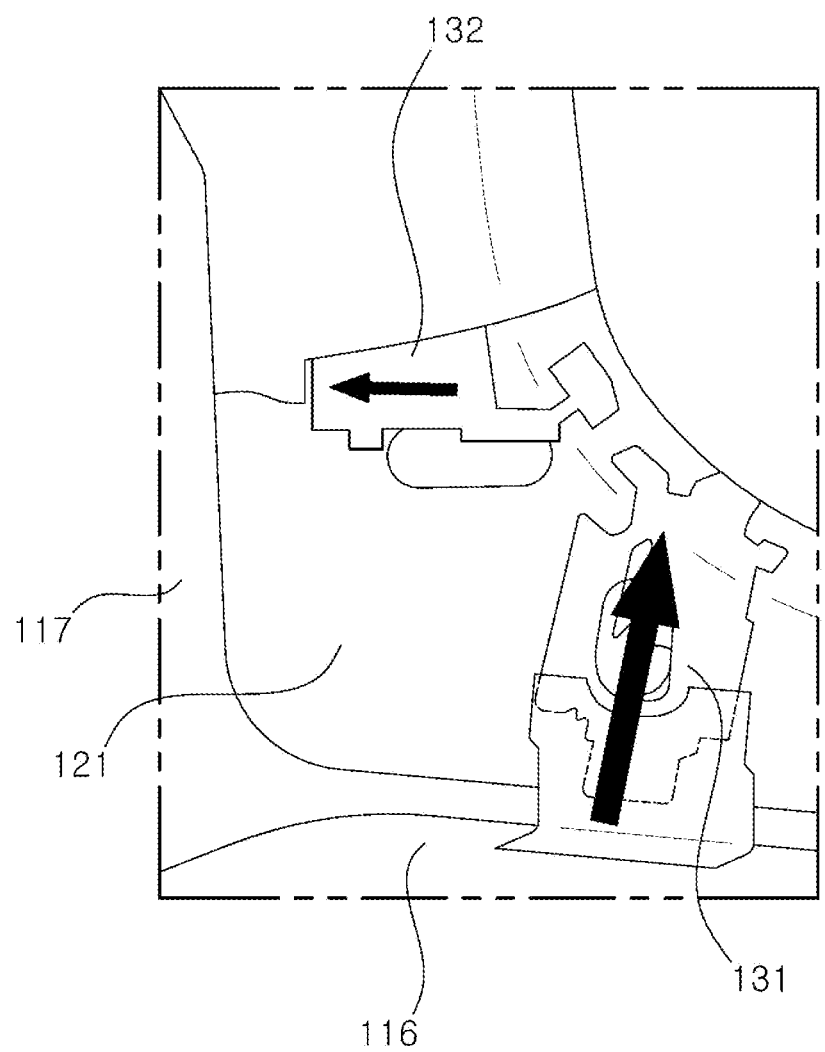
FIG. 3 is a schematic diagram showing a load path on the rear end part according to the related art.

Hereinafter, a coupling structure of a rear end module and a quarter rear member according to embodiments of the present disclosure will be described in detail with reference to the accompanying drawings.

A coupling structure of a rear end module and a quarter rear member according to embodiments of the present disclosure may include a quarter rear member 17 located on a rear portion of a side surface of a vehicle, a rear floor panel 16 in which a rear side member 14 arranged in a longitudinal direction of the vehicle is bonded to both sides of a bottom surface, a connection member 18 having an upper portion bonded to one side of the quarter rear member 17 and a lower end bonded to the rear floor panel 16, and a rear end module 20 formed by injection to have an annular shape and coupled to a rear end of the connection member 18.

The rear end module 20 formed by injection to have an annular shape may be coupled to the rear end part of the vehicle.

The rear end module 20 may be integrally formed by using a synthetic resin as a material. The rear end module 20 may be integrally formed in an annular shape, and is coupled to the rear end part of the vehicle. When a tailgate is closed, the rear end module 20 may become a portion in contact with the tailgate.

Ribs 20a may be formed inside the rear end module 20 to improve rigidity. The ribs 20a each may be radially formed, and a fastening bolt 25 to be described later may be fastened to a portion where the ribs 20a intersect.

The rear end part fastened to the rear end module 20 may become a rear end of a rear structure of a vehicle body composed of a roof panel, a roof side member 12, a middle member 13, the rear floor panel 16, the rear side member 14, the quarter rear member 17, and a wheelhouse 15.

Figure 4:
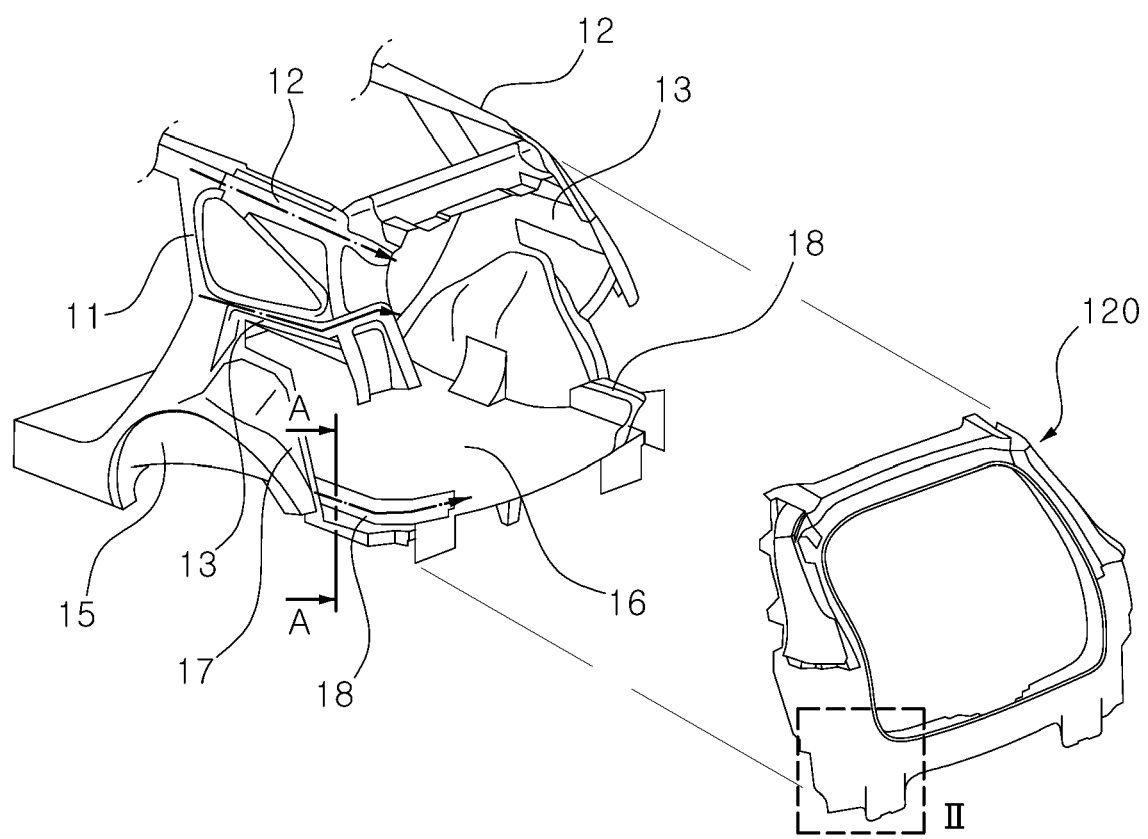
FIG. 4 is an exploded perspective diagram showing a state where a rear end module is coupled to the rear end part according to a coupling structure of the rear end module and a quarter rear member according to an embodiment of the present disclosure.

In particular, according to embodiments of the present disclosure, when the rear end module 20 is coupled to a lower end of the rear end part, that is, a rear end of each of the rear floor panel 16, the rear side member 14, the quarter rear member 17, and the wheelhouse 15, a load path is efficiently formed, thereby improving the rigidity of the vehicle body. A load acting in the longitudinal direction of the vehicle may be transmitted from a C-pillar member 11 to the rear end module 20 through the roof side member 12 and the middle member 13, or transmitted to the rear end module 20 through the wheelhouse 15 and the quarter rear member 17 (see the arrow in FIG. 4).

The rear end module 20 may be connected to a rear end of the quarter rear member 17 located on a rear portion of a side surface of the vehicle and a rear end of the rear floor panel 16 forming a rear floor of the vehicle. At this time, the quarter rear member 17 and the rear floor panel 16 may be connected to the rear end module 20 through the connection member 18.

Meanwhile, a reinforcing member 21 for reinforcing rigidity may be provided on a portion of the connection member 18 connected to the rear end module 20.

Figure 5:
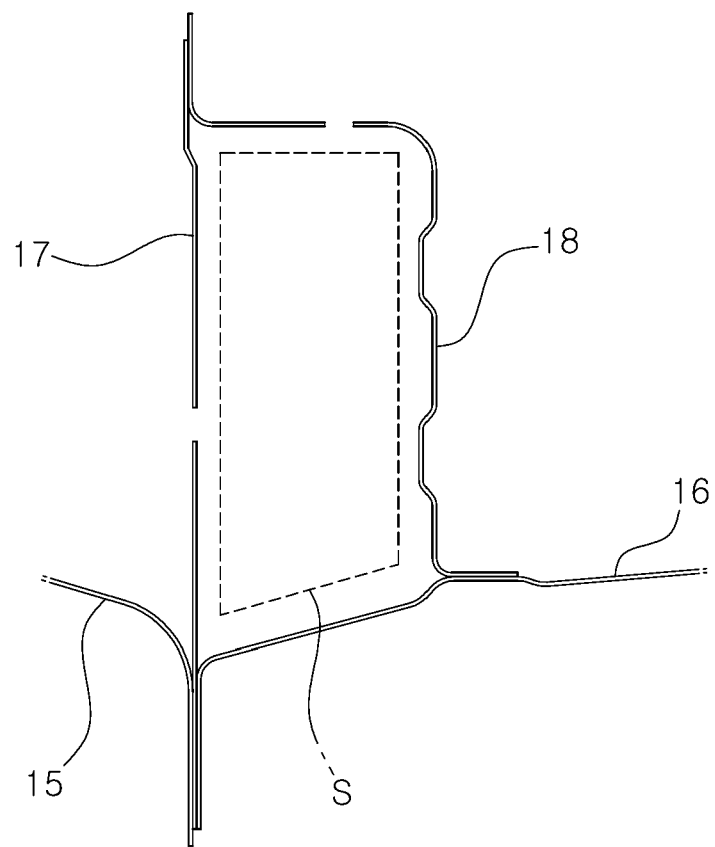
FIG. 5 is a cross-sectional diagram taken along line A-A of FIG. 4.
Figure 10:
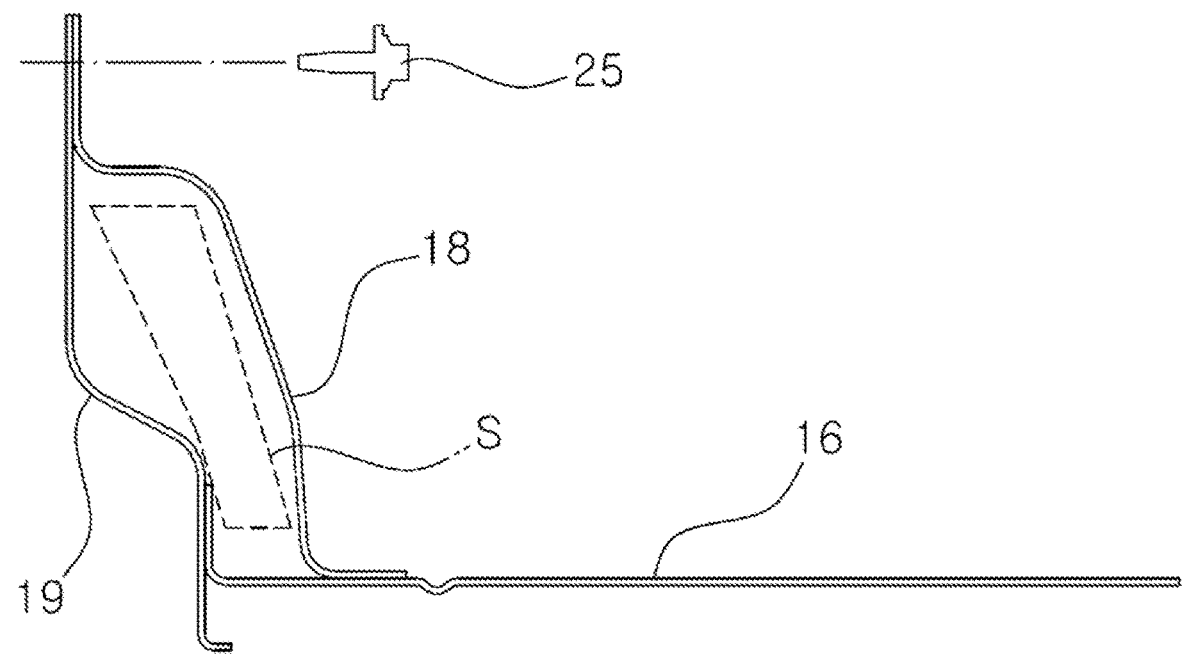
FIG. 10 is a cross-sectional diagram taken along line B-B of FIG. 4.
Figure 10:
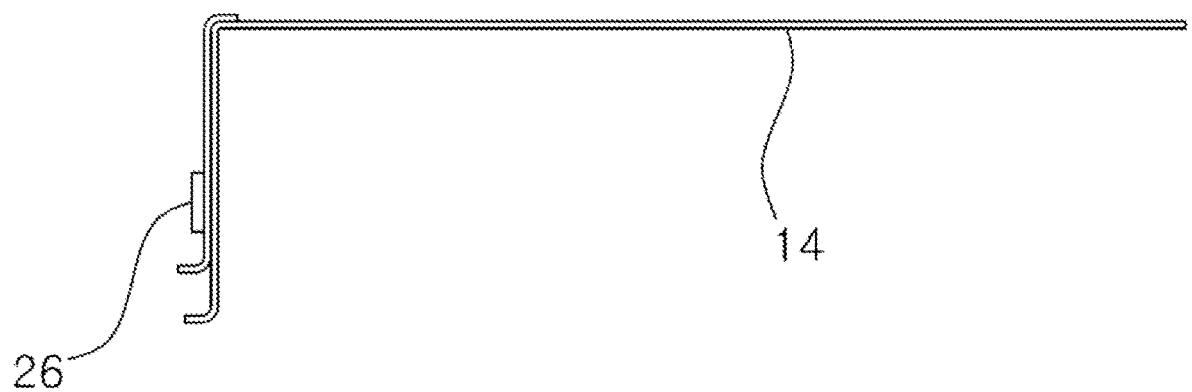

The reinforcing member 21 may be made of a metallic material such as a steel, unlike the rear end module 20 injected with a synthetic resin. When the rear end module 20 is injected, the rear end module 20 may be injected by an over-mold method so that the reinforcing member 21 is integrated with the rear end module 20. In a state where the reinforcing member 21 is disposed, the rear end module 20 may be injected by the over-mold method by injecting a synthetic resin, so that the reinforcing member 21 and the rear end module 20 are integrated with each other. In addition, in the portion of the rear end module 20 where the reinforcing member 21 is located, a closed cross section S may be formed between the rear end module 20 and the reinforcing member 21 by the over-mold method. The closed cross section may be connected to the closed cross section S formed by the connection member 18, so that rigidity is reinforced by the closed cross section S. In other words, the connecting member 18 may form the closed cross section S between the connection member 18, the quarter rear member 17, and a back panel 19 as the connection member 18 is connected to the quarter rear member 17 and the back panel 19 (see FIGS. 5 and 10), and the thus formed closed cross section S may be located on the same line as that of the closed cross section S formed by the over-mold method in the rear end module 20 to form the load path.

An upper end of the connection member 18 may be bonded to the quarter rear member 17. Middle and lower portions of the connection member 18 may be spaced apart from the quarter rear member 17. The lower end of the connection member 18 may be bonded to the rear floor panel 16. The rear floor panel 16 may be bonded to the lower portion of the quarter rear member 17. Accordingly, the closed cross section S may be formed by the quarter rear member 17, the connection member 18, and the rear floor panel 16 (see FIG. 5).

Figure 8:
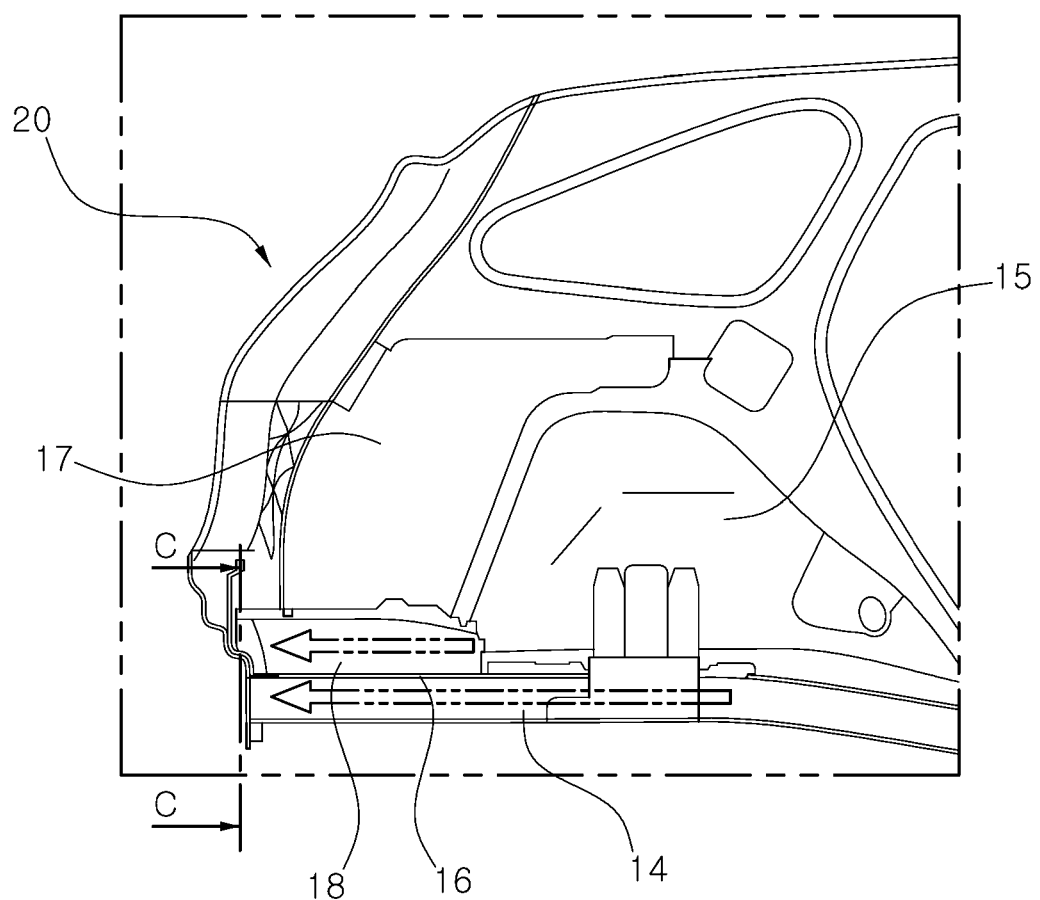
FIG. 8 is a side diagram of the coupling structure of the rear end module and the quarter rear member according to an embodiment of the present disclosure.
Figure 9:
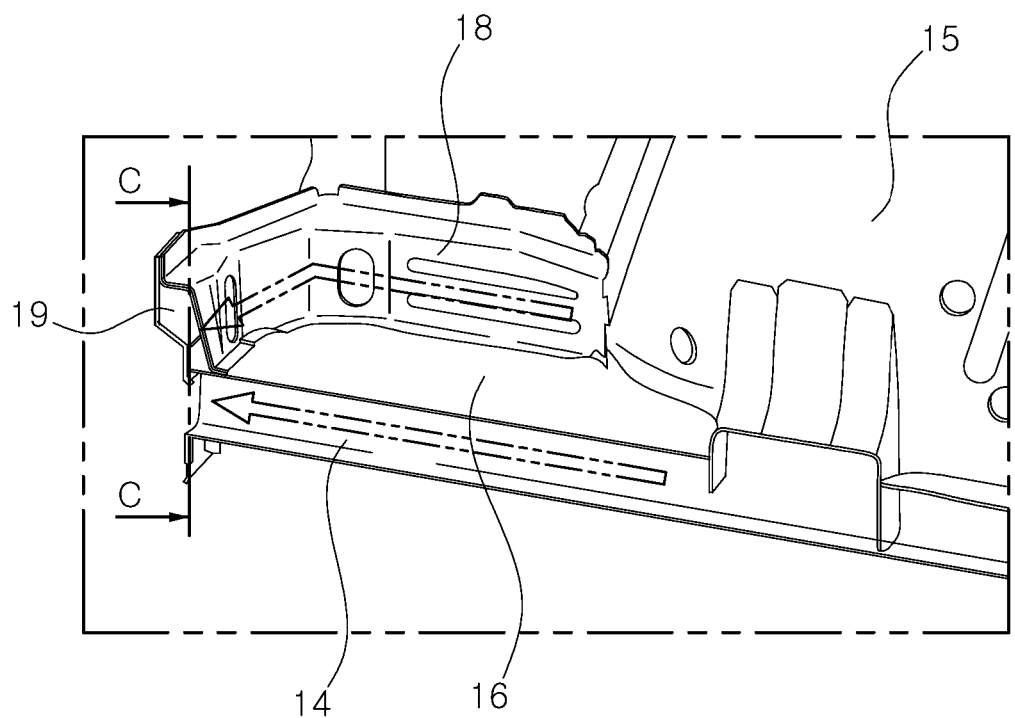
FIG. 9 is an enlarged bottom diagram of a main part of the coupling structure of the rear end module and the quarter rear member according to an embodiment of the present disclosure.
Figure 11:
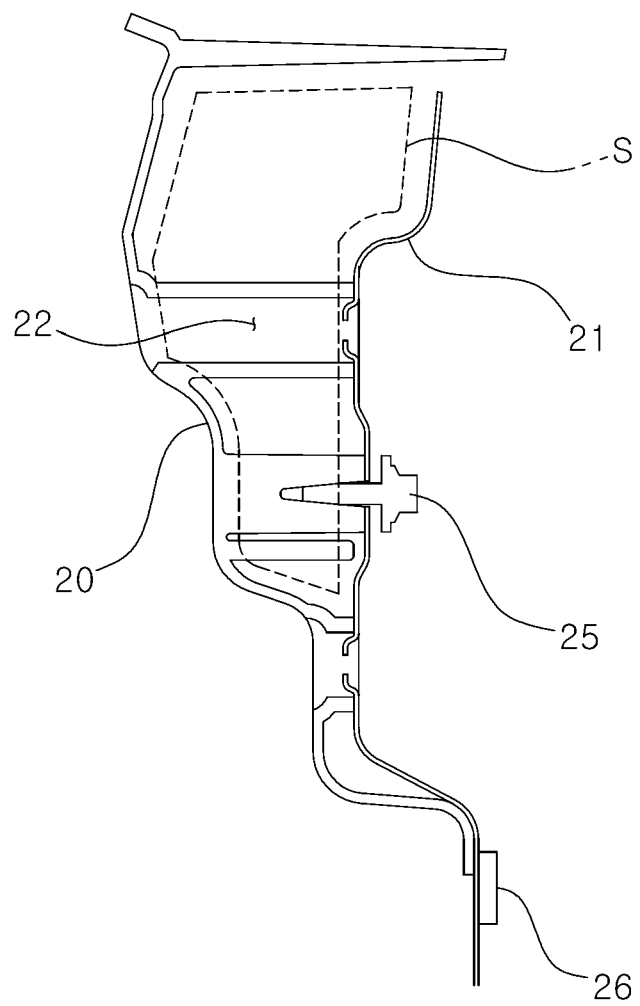
FIG. 11 is a cross-sectional diagram taken along line C-C of FIGS. 8 and 9.

The connection member 18 may be bent toward the inside of the vehicle from a rear end of the side surface of the vehicle along a circumference of the rear floor panel 16. A portion where the connection member 18 is bent may be coupled to the reinforcing member 21. At this time, the back panel 19 may be interposed between the connection member 18 and the reinforcing member 21, and as a gap is formed between the connection member 18 and the back panel 19, the closed cross section S is formed therebetween (see FIG. 11). For the closed cross section formed between the connection member 18 and the back panel 19, the closed cross section S formed by the quarter rear member 17, the connection member 18, and the rear floor panel 16 may form the load path together with the closed cross section S formed by the over-mold method in the rear end module 20 (see the arrows located on the tops in FIGS. 8 and 9).

The connection member 18 may be fastened to the reinforcing member 21 and the rear end module 20 through a fastening bolt 25. The fastening bolt 25 may be fastened to the rear end module 20 by penetrating the upper portion of the connection member 18 and the reinforcing member 21. Since the connection member 18 is bonded to the quarter rear member 17 and the rear floor panel 16, the quarter rear member 17 and the rear floor panel 16 may have the same effect as that of being fastened to the reinforcing member 21 and the rear end module 20.

Figure 6:
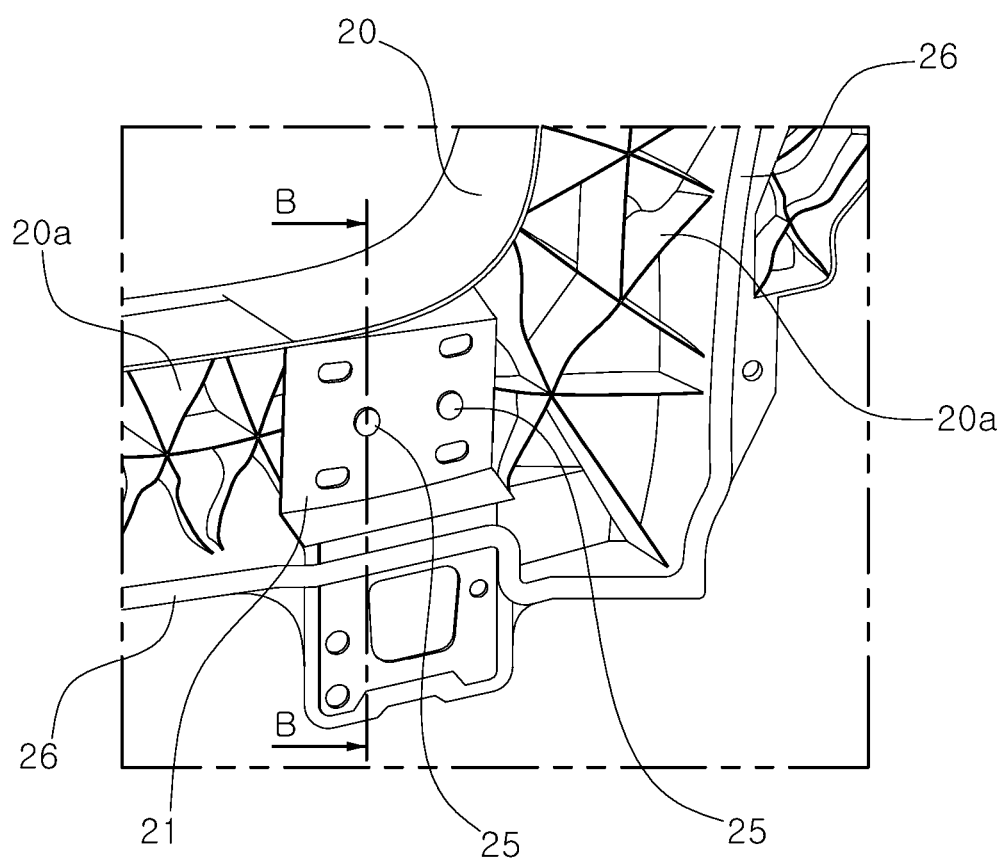
FIG. 6 is a detailed diagram showing the rear end module with respect to portion II of FIG. 4.
Figure 7:
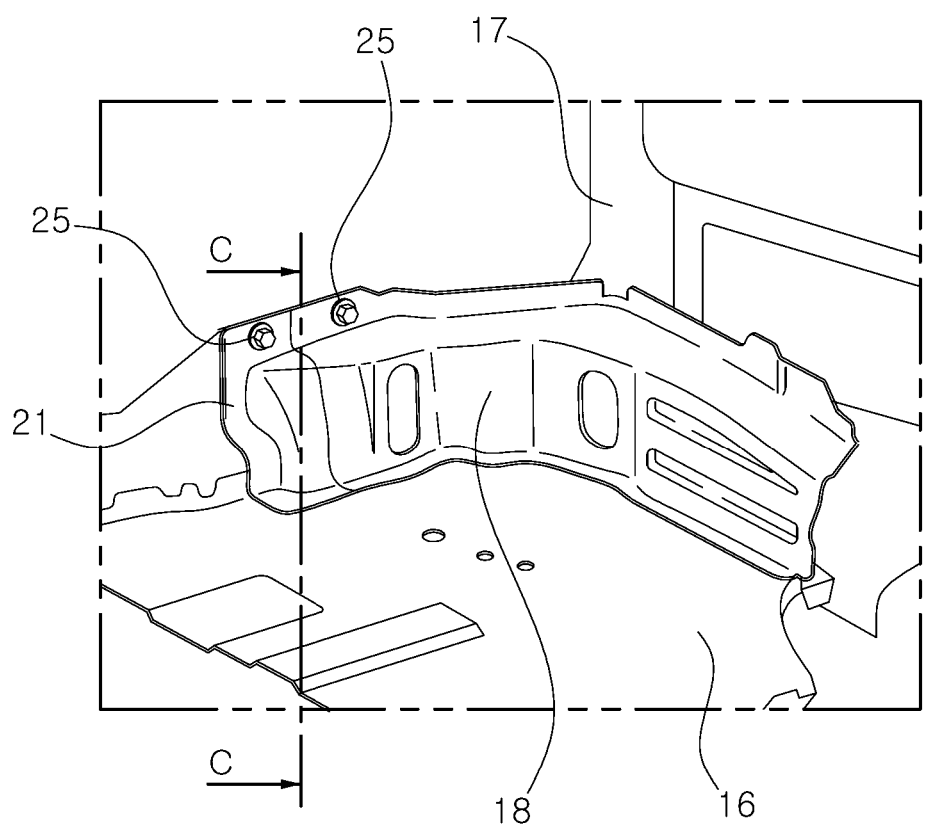
FIG. 7 is a detailed diagram showing a portion where the rear end module is coupled with respect to the portion II of FIG. 4.

The rear side member 14 may be bonded to a bottom surface of the rear floor panel 16. The rear side member 14 may have a structure in which the closed cross section is formed therein, and the rear side member 14 may be connected to the lower portion of the reinforcing member 21 to form another load path (see the arrows located at the bottoms in FIGS. 8 and 9). An adhesive 26 may be applied to the rear end of the rear side member 14 and is bonded to the lower portion of the reinforcing member 21 (e.g., a portion where a through hole is formed in FIG. 6) by the adhesive 26.

What is claimed is:

1. A coupling structure of a rear end module and a quarter rear member comprising:
   a quarter rear member configured to be located on a rear portion of a side surface of a vehicle;
   a rear floor panel;
   a connection member having an upper portion bonded to one side of the quarter rear member and a lower end bonded to the rear floor panel;
   a rear end module formed by injection to have an annular shape and coupled to a rear end of the connection member;
   a reinforcing member provided on one side of a front surface of the rear end module in order to reinforce rigidity between the rear end module and the connection member;
   a back panel interposed between the connection member and the reinforcing member;
   wherein a first closed cross section is formed between the connection member, the quarter rear member, and the back panel;
   wherein a second closed cross section is formed between the rear end module and the reinforcing member; and
   wherein the first closed cross section connects the second closed cross section to form a load path.

2. The coupling structure of claim 1, wherein the connection member has middle and lower portions, other than the upper portion, spaced apart from the quarter rear member, and the lower end bonded to the rear floor panel, so that a third closed cross section is formed between the quarter rear member, the connection member, and the rear floor panel.

3. The coupling structure of claim 1, wherein the connection member is bent toward an inside of the vehicle on the rear end of the side surface of the vehicle along a circumference of the rear floor panel.

4. The coupling structure of claim 1, wherein the connection member is bent may be coupled to the reinforcing member.

5. The coupling structure of claim 1, wherein the reinforcing member is made of a metallic material.

6. The coupling structure of claim 1, wherein the rear end module is injected with a synthetic resin.

7. The coupling structure of claim 1, wherein the rear end module is injected by an over-mold method and coupled to the reinforcing member, so that the closed cross section is formed on the rear end module.

8. The coupling structure of claim 1, wherein a fastening bolt is provided to fasten to the rear end module by penetrating the upper portion of the connection member and the reinforcing member.

9. The coupling structure of claim 1, wherein a rear end of a rear side member is bonded to the reinforcing member and the rear end module by an adhesive.

10. The coupling structure of claim 1, wherein a side end of the rear floor panel is bent downward and bonded to a lower portion of the quarter rear member.

11. The coupling structure of claim 10, wherein in a portion of the quarter rear member where the rear floor panel is bonded, a wheel housing is bonded to a side opposite to the rear floor panel.

12. The coupling structure of claim 1, wherein ribs are radially formed inside the rear end module.

13. The coupling structure of claim 1, wherein a rear side member is bonded to a bottom surface of the rear floor panel.

14. A vehicle comprising the coupling structure of claim 1.

* * * * *